United States Patent

Whitlow

[15] 3,662,218
[45] May 9, 1972

[54] GROUND FAULT INTERRUPTOR CIRCUIT

[72] Inventor: George A. Whitlow, 815 Clebud Drive, Euless, Tex. 76039

[22] Filed: June 19, 1970

[21] Appl. No.: 47,649

[52] U.S. Cl. .......................... 317/18 D, 317/33 SC, 317/27
[51] Int. Cl. .................................. H02h 1/02, H02h 3/28
[58] Field of Search ............................ 317/18, 27, 28, 33

[56] References Cited

UNITED STATES PATENTS

| 3,213,321 | 10/1965 | Dalziel | 317/18 D |
| 3,407,337 | 10/1968 | Benham | 317/18 D |

*Primary Examiner*—J. D. Miller
*Assistant Examiner*—Harvey Fendelman
*Attorney*—Walter J. Jagmin

[57] ABSTRACT

A circuit for actuating a circuit breaker to disconnect a load from across conductors connecting the load across an input circuit which has one neutral side upon the occurrence of an imbalance in the currents flowing in the conductors. The circuit includes a differential transformer having a bifilar pair of windings wound on a toroidal core, the winding being connected in series with separate conductors of the input circuit. The permeability of the toroidal core of the transformer is quite low when the currents in the two conductors are equal or almost equal and increases greatly to decrease the inductance of a sensing winding, also wound about the core and energized with a pulsating current, upon the occurrence of an imbalance in the currents flowing in the two conductors. The circuit includes a transistor and SCR circuit responsive to the change in the inductance of the sensing winding for energizing the circuit breaker upon an increase in the inductance of the sensing winding to disconnect the load from across the two conductors. The circuit may also include a check circuit for insuring that the windings of the differential transformer are properly connected across the input circuit.

4 Claims, 1 Drawing Figure

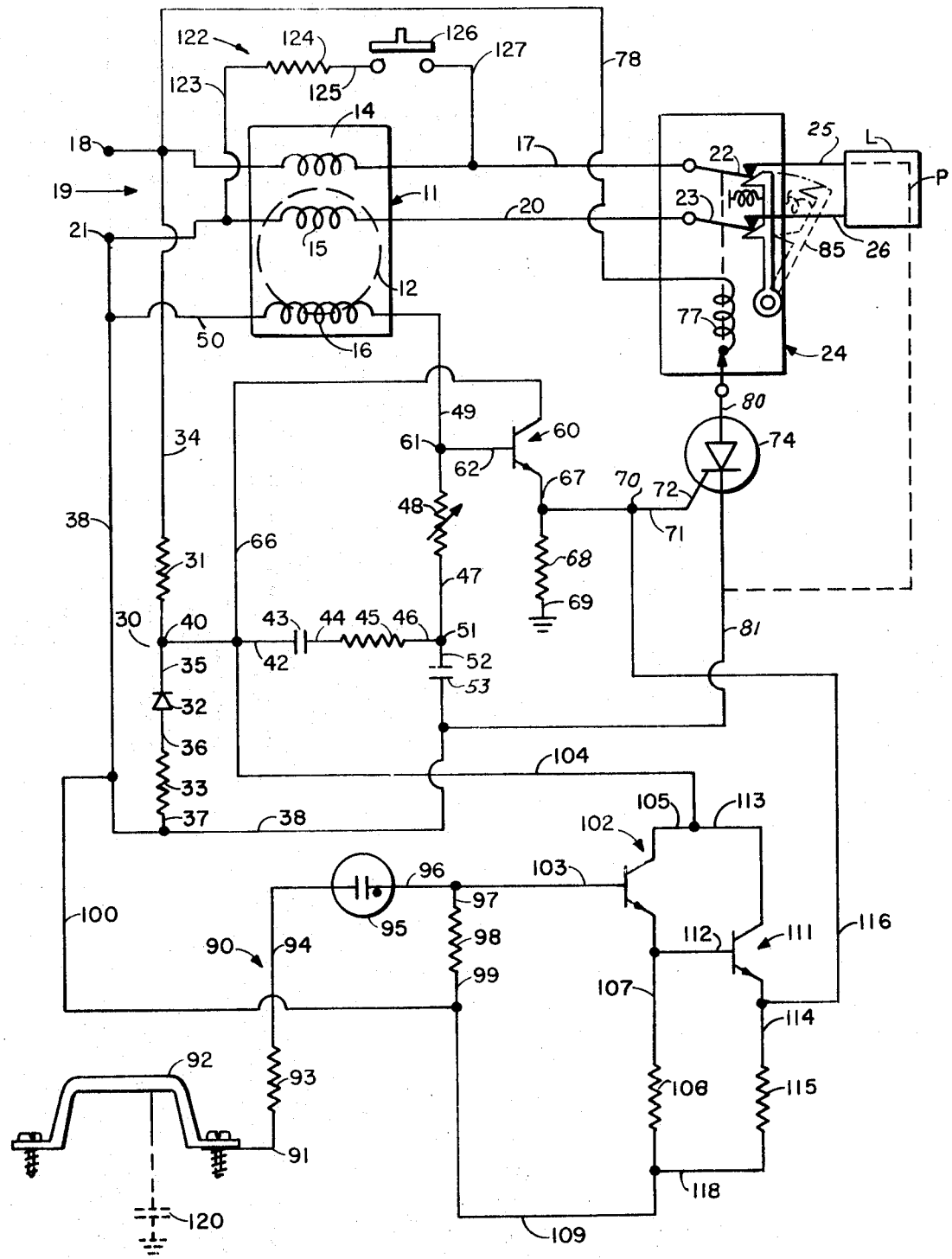

3,662,218

GROUND FAULT INTERRUPTOR CIRCUIT

This invention relates to control circuits and more particularly to a ground fault interruptor circuit for disconnecting a load from across an alternating current input circuit whenever the load provides a secondary path, or "ground," from the "-hot" line of the input circuit to its neutral or common line.

An object of this invention is to provide a new and improved ground fault interruptor circuit for disconnecting a load from across an input circuit of alternating current whenever a ground occurs in the load and provides a secondary path from the one line to the other.

Another object is to provide a ground fault interrupter circuit which is insensitive to spurious signals or electrical noise and will operate only on the occurrence of a ground through the load.

Still another object is to provide a ground fault interruptor circuit which is operable over a relatively wide range of voltage of the input circuit.

An important object is to provide a ground fault interruptor circuit of the type described which is relatively inexpensive to manufacture.

Additional objects and advantages of the invention will be readily apparent from the reading of the following description of a device constructed in accordance with the invention, and reference to the accompanying drawings thereof, wherein:

The single FIGURE is a diagrammatic illustration of the ground fault interruptor circuit embodying the invention.

Referring now to the drawing, the ground fault interruptor circuit 10 embodying the invention includes a differential transformer 11 whose core 12 has square hysteresis loop characteristic, such as is commercially available under the trademark Deltamax, and on which are wound a pair of windings 14 and 15 and a sensing winding 16. The coils 14 and 15 have a small number of turns, for example 3 or 4 and are bifilar wound. The high impedance sensing winding has a large number of turns, for example, 1,000. The winding 14 is connected in the conductor 17 which is connected to the "hot" side 18 of an input circuit 19 of alternating current. The other winding 15 is connected in the conductor 20 which is connected to the other neutral side 21 of the input circuit.

The conductors or lines 17 and 20 are connected through the contacts 22 and 23 of a circuit breaker 24 to conductors 25 and 26, respectively, across which the load L is connected.

A voltage regulating circuit 30 connected across the opposite sides 18 and 21 of the input circuit includes a resistance 31, a Zener diode 32 and resistance 33 which are connected in series across the input circuit by means of the conductors 17, 34, 35, 36, 37 and 38. Due to the conduction of the Zener diode when a positive voltage is applied to one side thereto from the line 17 through the resistance 31, the voltage at the common connection 40 of the Zener diode and the resistance 31 is a substantially square wave positive voltage, whose amplitude is determined by the characteristics of the Zener diode. The square wave voltage at the common connection 40 may, for example, have a maximum value of 20 volts and a frequency of 60 cycles per second where the input across the input circuit is a 115-volt, 60-cycle per second alternating current.

The sensing winding is connected across the Zener diode 32 and the resistance 33 through a pulse shaping circuit 41 to cause the sensing winding to be energized with a pulsating current of since wave, instead of square wave, by means of a conductor 42, a blocking capacitor 43, a conductor 44, a resistnace 45, the conductors 46 and 47, a variable resistance 48, the conductors 49, 50, 38 and 37. The common connection 51 of the resistances 45 and 48 is connected to the conductor 38 by means of the conductor 52, capacitor 53 and conductor 54. The pulse shaping network includes the capacitors 43 and 53, the resistances 45 and 48 and, of course, the winding 16 itself due to its inductance.

A control transistor 60, whose emitter collector circuit is connected across the Zener diode 32 and the resistance 33, has its base connected to the common connection 61 of the variable resistance 48 and the sensing winding 16 by a conductor 62.

During normal operation, the variable resistance 48 is set to such value that the positive voltage applied to the base of the control transistor is maintained below the value that is necessary to cause the emitter-collector circuit of the control transistor to be rendered conductive. For example, as long as no ground occurs at the load L, the common connection 61 is maintained at a 0.6 volt and the emitter-collector circuit is non-conductive.

The collector of the transistor 60 is connected to the common connection 40 by the conductors 66 and 42 while its emitter is connected to ground through the conductor 67, the resistance 68 and the conductor 69.

It will thus be seen that a pulsating positive voltage is constantly applied across the emitter-collector circuit of the control transistor and that the emitter-collector circuit will become conductive whenever the voltage applied to the base of the control transistor increases to a predetermined value, for example, 1 volt.

The common connection 70 of the collector of the control transistor 60 and the resistance 68 is connected by a conductor 71 to the control electrode 72 of an SCR 74. When the emitter collector circuit of the control transistor is rendered conductive, a positive voltage is applied to the control electrode and causes the SCR to become conductive.

The SCR, when rendered conductive, energizes the winding 77 of the circuit breaker 24, the SCR then connecting the circuit breaker winding across the input circuit 19 by means of the conductor 78, 80, 81 and 38. The winding 77 will, of course, be energized only during the first positive half cycle of the alternating current applied across the input circuit 19 since the SCR conducts in only one direction. The contacts 22 and 23, however, once they have been moved to their open position are held in such open positions by a latch 85 or other usual holding means of the circuit breaker so that once the winding 77 of the circuit breaker is energized, the circuit breaker contacts are moved to open positions and are latched or held in such open positions until the latch 85 is manually operated to reset the circuit breaker contacts to their closed positions.

In normal operation, the contacts 22 and 23 of the circuit breaker are in the closed positions illustrated in the drawing. The load, which may be an electrically operated machine, hand tool, and the like, is connected across the input circuit and is energized. The bifilar windings 14 and 15 are so wound on the toroidal core 12 that the magnetic flux induced in the core by one of the windings is opposite to that induced in the core by the other winding and thus the two equal magnetic fluxes so induced cancel each other. As a result, the core is in magnetically unsaturated condition and has a relatively small permeability. The positive substantially sine wave voltage applied across the sensing winding 16 is in phase with the voltage applied across the winding 14 and the magnetic flux induced by current flowing through the sensing winding is in the same direction as the magnetic flux induced by the current flowing in the winding 15. The magnetic fluxes induced by currents flowing in these two windings 15 and 16 thus add instead of cancel, cause saturation of the core and, therefore, the inductance of the sensing winding 16 to be relatively great. As a result, the maximum positive pulsating voltage applied to the base of the control transistor is relatively low, for example, 0.6 volt, and the emitter collector circuit of the control circuit transistor 60 is not conductive. The control electrode 72 of the SCR is therefore maintained at ground potential and the SCR is also non-conductive.

Should a ground now occur in the load causing a secondary path P between the conductor 25 and the neutral side 21 of the input circuit, the current flowing in the winding 14 will increase while the current in the winding 15 will not change. As a result, an imbalance in the currents flowing in the windings 14 and 15 occurs, thus causing the magnetic flux induced in the core by the current flowing through the winding 14 to become greater than the opposite magnetic flux induced in the cord by the current flowing through the winding 15. Due to the square wave hysteresis loop characteristic of the core 12, the permeability of the core is increased greatly by even a very small current imbalance in the two windings 14 and 15, and the inductance of the sensing winding increases greatly. This increase in the inductance of the sensing winding causes the voltage applied to the base of the control transistor 60 to increase above the critical value necessary to render its emitter-collector circuit conductive. A positive half cycle of the voltage applied to the control electrode 72 of the SCR now causes the SCR to be conductive and connect the circuit breaker winding across the input circuit 19. Electric current will now flow through the SCR and the circuit breaker winding 77 upon the next positive half cycle of alternating current applied across the input circuit 19, causing the contacts 22 and 23 to be moved to their open position and thus disconnecting the load L from across the input circuit. Once the contacts 22 and 23 move to their open positions, they are latched or held in their open positions even though the winding 77 becomes de-energized upon the next negative half cycle of the alternating current applied across the input circuit 19. Once the contacts 22 and 23 have moved to their open positions no current, of course, will flow in either of the windings 14 and 15, the impedance of the sensing winding 16 will again increase greatly and the emitter-collector circuit of the control transistor will become non-conductive.

It will now be apparent that a new and improved circuit for disconnecting a load from across an alternating current input circuit has been illustrated and described which will operate very quickly, for example, in 1/120th of a second after the occurrence of a ground through a load L to disconnect the load from across the input circuit so that any person who is operating the load and is holding such hand tool, will not have the voltage applied to him for a period of more than 1/120th of a second. The current caused to flow through a person's body by an alternating current circuits of 115 volts for such short period of time will not cause any harm to the person, severe damage or electrocution of the person subjected to such voltage being caused by a prolonged conduction of current through his body due to the fact that the person cannot release the hand tool while subjected to such voltage.

It will be apparent that even though the voltage across the input circuit 19 may vary considerably, for example, between 85 and 135 volts, due to the provision of the voltage regulating circuit 30, the ground fault interruptor circuit will continue to remain operable.

The windings 14 and 16 must be so connected that the magnetic flux induced in the core 12 by the current flowing in the winding 14 must be in the same phase and in the same direction as the flux induced in the core 12 by the current flowing in the sensing winding 16. If the conductors 17 and 20 were improperly connected across the input circuit, that is, conductor 17 were connected to the side 21 and the conductor 20 were connected to the side 18 of the input circuit, the pulsating current in the sensing winding 16 would be opposite in phase to the alternating current flowing in the winding 15 and the fluxes induced in the core would tend to cancel each other and the interruptor circuit would not function properly in the event the ground occurred at the load L. Since the inductance of the winding 16 would then not increase greatly, a polarity check circuit 90 is provided to ensure that the conductors 17 and 20 are properly connected to the sides 18 and 21, respectively, of the circuit. The polarity check circuit 90 may include a conductor 91 which is connected to the metal handle 92 of the case in which the ground fault interruptor circuit is mounted and through a resistance 93 and conductor 94 to a neon lamp or glow discharge device 95. The other side of the neon lamp is connected to the side 21 of the input circuit by the conductors 96 and 97, a resistance 98, and the conductors 99, 100 and 38, and to the base of a transistor 102 by the conductors 96 and 103. The emitter collector circuit of the transistor 102 is connected to the common connection 40 by the conductors 42, 104 and 105 and to the neutral or common side 21 of the input circuit through the conductor 107, the resistance 108 and the conductors 109, 100 and 38.

When the emitter-collector circuit of the transistor 102 is rendered conductive, its output signal is transmitted to the base of a transistor 111 by the conductors 107 and 112. The base of the transistor 111 is connected to the common connection of the emitter of the transistor 102 and the resistance 108 by the conductor 112.

The emitter collector circuit of the transistor 111 is connected to the common connection 40 by the conductors 42, 104 and 113 and to the control electrode 72 of the SCR 74 by the conductors 114, 116 and 71. The emitter of the transistor 111 is connected to the common side 21 through the conductor 114a, a resistance 115 and the conductors 118, 109, 100 and 38.

If, through error, the conductor 17 is connected to the common or neutral side 21 of the input circuit 19, the conductor 20 is connected to the side 18 thereof and the operator is holding the metal handle 92 of the case or housing in which the interruptor circuit 10 is housed, the capacity 120 of the body of the operator holding the handle 92 causes the neon lamp or glow discharge device 95 to discharge, thus causing a positive potential to be applied to the base of the transistor 102 which is thus rendered conductive and in turn renders the emitter-collector circuit of the transistor 111 conductive. This in turn causes a positive potential or voltage to be applied to the control electrode 72 of the SCR which will then be rendered conductive at the first positive going pulse of the alternating current in the line or conductor 17 and will thus cause the circuit breaker contacts 22 and 23 to move to their open positions wherein they are held by the latch 85. The operator will then immediately become aware that the connection of the conductors 17 and 20 to the two sides 21 and 18 of the input circuit 19 must be reversed.

A test circuit 122 is provided for testing the operability of the interruptor circuit and includes a conductor 123 connected to the conductor 20, a resistance 124, a conductor 125, a manually operable switch 126 and a conductor 127 which is connected to the conductor 17. It will be apparent that when the manually operated switch 126 is depressed to connect the conductors 125 and 126, a secondary path between the conductors 17 and 20 is provided which causes a greater current to flow in the bifilar winding 14 than in the winding 15 and thus causing the circuit to operate and cause the circuit breaker to be energized.

It will now be seen that a new and improved ground fault interruptor circuit has been illustrated and described which is of simple economical structure and which includes a sensor means, such as differential transformer 11, for sensing the current unbalance in the lines or conductors which connect the load to opposite sides of an alternating current input circuit and which has a sensing winding energized by a low voltage pulsating current whose inductance increases upon the occurrence of a current imbalance in the two lines to cause actuation of a control means, such as the control transistor 60 and the SCR 74, to cause an electrically operable switch means, such as the circuit breaker 24, to disconnect the load from the conductors.

It will further be seen that the control circuit includes a voltage regulating means, such as the circuit 30, for providing a voltage regulated pulsating current to the sensing winding of the differential transformer which causes the amplitude of the pulsating voltage to remain constant even though the alternating voltage which is supplied to the regulating circuit may vary substantially.

It will further be seen that since the voltage of the pulsating current applied across the base emitter circuit of the control transistor 60, which varies in accordance with the inductance of the sensing winding, must increase substantially from its normal value before the control transistor is actuated, i.e., its emitter-collector circuit is energized, the interruptor circuit will not be caused to operate by transient disturbances or noise.

It will further be seen that the ground fault interrupter circuit may include a polarity check circuit 90 for operating the switch means of the circuit if the ground fault circuit is improperly connected to the alternating current input circuit.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A ground fault interruptor circuit for disconnecting a load from across an input circuit of alternating current, said interruptor circuit including: a pair of conductors for connecting a load across an input circuit of alternating current; a differential transformer having a core and a pair of windings, one of said windings being connected in one of said conductors and the other of said pair of windings being connected in the other of said conductors, alternating currents flowing through each of said windings tending to induce magnetic fluxes of opposite polarities in said core whereby the permeability of said core is small when equal currents flow in said windings, said transformer including a sensing winding whose inductance varies in accordance with the permeability of said core, aid core being toroidal in form and having square loop hysteresis characteristic; electrically operable switch means between said pair of windings and said load for disconnecting said load from said conductors; and control means responsive to the inductance of said sensing winding for actuating said switch means to disconnect said load from said conductors when the inductance of said sensing winding exceeds a predetermined value, said control means including means connectible across said input circuit and operatively associated with said sensing winding for energizing said sensing winding with a pulsating direct current of the same phase and the same frequency as the current flowing in one of said pair of windings.

2. The ground fault interruptor circuit of claim 1, wherein said control means comprises a control transistor operatively associated with said sensing winding and having an emitter-collector circuit which is rendered conductive when the inductance of said sensing winding exceeds said predetermined value.

3. The ground fault interruptor circuit of claim 2, wherein said switch means includes a fourth winding and contact means movable to open position when said fourth winding is energized, and rectifier means operatively associated with said control transistor and connected in series with said fourth winding, said rectifier means being rendered conductive when said emitter-collector circuit is rendered conductive.

4. The ground fault interruptor circuit of claim 3, and a polarity check circuit operatively associated with said control transistor for rendering said emitter-collector circuit conductive when the current flowing in said sensing winding is not of the same phase as the current flowing in said one one of said windings.

* * * * *